United States Patent [19]

Tozzi

[11] 4,339,878
[45] Jul. 20, 1982

[54] DEVICE FOR CUTTING FLOWERS, FRUIT AND THE LIKE

[76] Inventor: Vincenzo G. A. Tozzi, 1166 Monticello Rd., Lafayette, Calif. 94549

[21] Appl. No.: 198,622

[22] Filed: Oct. 20, 1980

[51] Int. Cl.³ .............................................. B26B 27/00
[52] U.S. Cl. ......................................... 30/298; 30/291
[58] Field of Search .................................. 30/298, 291

[56] References Cited

U.S. PATENT DOCUMENTS

| 1,162,264 | 11/1915 | Unsinger | 30/291 |
| 2,597,564 | 5/1952 | Bugg | 30/298 |
| 2,676,400 | 4/1954 | Darpinian | 30/298 |
| 4,177,698 | 12/1979 | Greneker | 30/298 |

FOREIGN PATENT DOCUMENTS

| 90398 | 2/1897 | Fed. Rep. of Germany | 30/298 |
| 343785 | 11/1921 | Fed. Rep. of Germany | 30/298 |
| 12054 | 5/1896 | Switzerland | 30/298 |
| 500028 | 2/1939 | United Kingdom | 30/298 |
| 675386 | 7/1952 | United Kingdom | 30/298 |

Primary Examiner—Jimmy C. Peters
Assistant Examiner—J. T. Zatarga
Attorney, Agent, or Firm—Bucknam and Archer

[57] ABSTRACT

A device for cutting flowers, fruit and the like is described which comprises a thimble to be inserted on the thumb of one hand. The device is provided with a channel for insertion of a cutting tool and with a flange on the side opposite to the cutting tool, the flange providing support for the index finger of the same hand to rest during the cutting operation. The channel is a longitudinally tapered blade shank retainer channel provided with two lips in face to face relationship.

5 Claims, 7 Drawing Figures

DEVICE FOR CUTTING FLOWERS, FRUIT AND THE LIKE

The present invention relates to cutting tools for flowers, fruit, vegetables, small branches and the like in total replacement of conventional scissors.

Italian Pat. Nos. 948,731 and 1,004,257 describe a tool which may be applied on the thumb of one hand, usually the right hand, in a manner similar to the finger of a glove and which provides for the insertion of different blades depending upon the items which must be cut. According to one embodiment of the invention described in the two above-mentioned Italian Patents, the device also provides for a thimble to be inserted on the thumb of the right or the left hand as well as on the index, similar to a glove limited to the thumb and index or two separate thimbles may be provided, one for the thumb and one for the index.

The devices of the two above-mentioned Italian patents have proved to be very useful in actual operation insofar as they are used with only one hand while the other hand is kept free for other operations, for instance, holding a basket, etc. or the operator uses one hand for holding himself onto a ladder. The devices of these two patents, however, require two thimbles one for the thumb and one for the index or a glove with two fingers. Obviously, when pressure is required to cut a stem or a branch, the thumb alone is not sufficient to carry out the entire cutting operation or the pressure applied through the index alone is not adequate.

The object of the present invention is to simplify the article of the two above-mentioned Italian Patents. Another object is to provide an improvement of the thimble of the two above-mentioned Italian patents.

More specifically, the device of the present invention permits to cut flowers, fruit, etc., using only one hand so that the other hand is still available to perform other functions and only one thimble is provided for the thumb with the index being used to apply pressure so that only two fingers of one hand are engaged during actual operation.

Essentially, the invention comprises a thimble to be inserted on the thumb of the right or left hand, preferably the right hand for most people. The thimble is provided with a flange where the index of the same hand rests. At the opposite end, the device is provided with a recess or a channel for insertion of the blade.

The invention is further illustrated by reference to the accompanying drawing of which:

Figure 5:
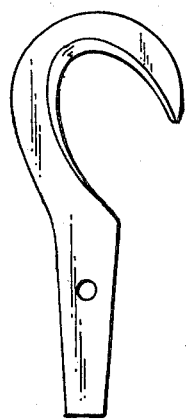
Figure 6:
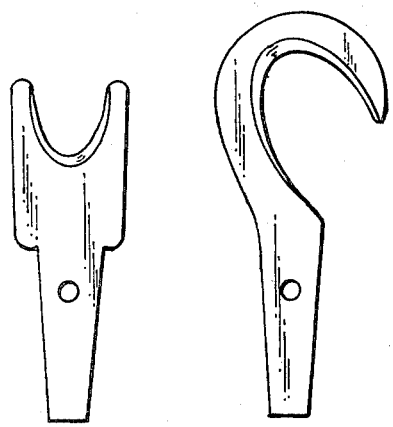
Figure 7:
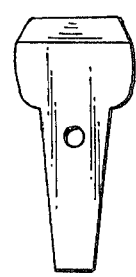

FIGS. 5, 6, and 7 illustrates different types of blades which may be used together with the article of the present invention.

Figure 1:
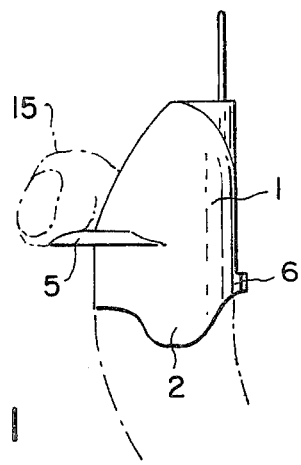
FIG. 1 is a view of the thimble in actual operation.
Figure 3:
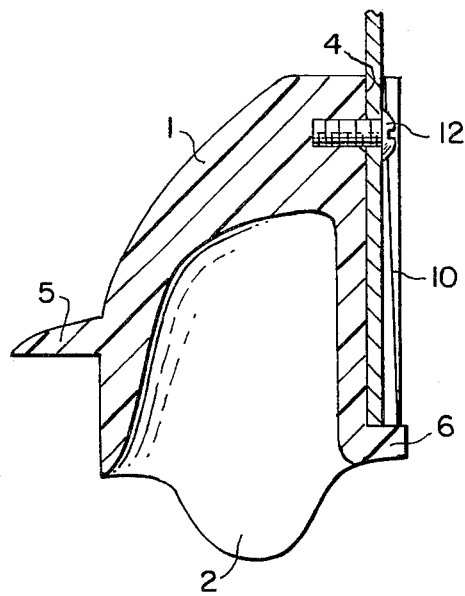
FIG. 3 is a cross-sectional view of the thimble.
Figure 2:
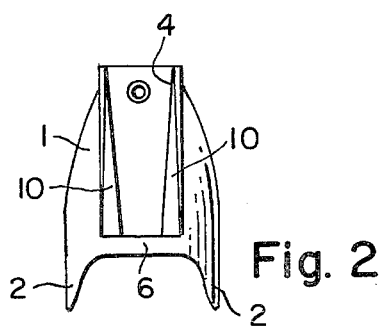
FIG. 2 is a front view of the thimble without the blade.
Figure 4:
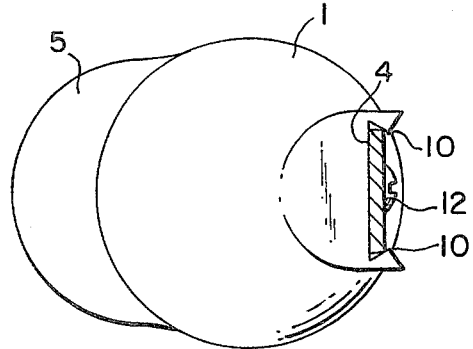
FIG. 4 is a top planar view of the thimble.

As shown in FIGS. 1, 2, and 3, the article comprises a thimble 1 of a width to fit the dimensions of the user. The length should be such as not to interfere with the articulation of the thumb, and specifically not exceeding the length up to the first phalanx. The thimble may be provided with two extensions at the lower ends 2 on opposite sides for better grip on the thumb, (not shown). The thimble has a curved surface to follow the shape of the thumb and is additionally provided with flange 5 on the side opposite to the side where the blade is inserted. As shown in FIG. 1, the thumb is inserted in the thimble while the index of the same hand 15 rests on the flange. In this manner, the pressure required for cutting fruit, flowers, etc., is provided by the index and it is not necessary to use the other hand for the cutting operation nor is it necessary to use two thimbles.

A variety of cutting tools may be inserted in the channel or recess, for instance the cutting tool may have the shape of a "U" as shown in FIG. 5, or may have the shape of a hook as shown in FIG. 6, or it may be tapered as shown in FIG. 7. For the purpose of securing the cutting tool in place so that it will not slide downwardly, the recess 4 in which the cutting tool is inserted does not extend to the lower end of the cutting tool, but provides for a stepped portion designated in the figure by numeral 6.

More specifically, the channel 4, as shown in FIG. 2, comprises a longitudinally tapered blade shank retainer channel which comprises two lips in face to face relationship, one to the other, designated by numeral 10 and which lips do not reach the bottom of the thimble. Further, a screw 12 is provided for the purpose of holding the blade in place and also for substituting one blade with another blade when necessary.

The improved thimble permits to cut fruit, flowers, etc., with only one hand while the other hand may be engaged in other operations. Further, pressure needed for the cutting operation is exerted through the index. The thimble of the present invention may be made of a plastic material of any size to fit the size of the user. The device may be used on the thumb of the left or the right hand.

What is claimed is:

1. A device for cutting flowers, fruit or the like which comprises a thimble to be inserted on the thumb of one hand, the thimble comprising an essentially cylindrical portion and a tapered portion closed at the top and integral with said cylindrical portion, said thimble being provided with a channel for insertion of a cutting tool in a direction parallel to the axis of the thimble, and with a flange on the side opposite to the cutting tool, said flange being spaced from the lower end of the thimble, said flange being essentially perpendicular to the axis of the thimble, said flange providing support for the index finger of the same hand to rest during the cutting operation.

2. The device, according to claim 1, wherein said flange is located at the point where said cylindrical portion meets with said tapered portion.

3. The device according to claim 1 which is provided with two opposite lower extensions to hold the device on the thumb.

4. The device according to claims 1 or 3 wherein said channel is a longitudinally tapered blade shank retainer channel provided with two lips in face to face relationship.

5. The device according to claim 4 wherein said cutting tool is a blade and a screw is provided to hold the blade within said channel.

* * * * *